(12) United States Patent
Kempf et al.

(10) Patent No.: US 11,729,370 B2
(45) Date of Patent: Aug. 15, 2023

(54) MULTI-PERSPECTIVE DISPLAY DRIVER (71) Applicant: Texas Instruments Incorporated, Dallas, TX (US)

(72) Inventors: Jeffrey Mathew Kempf, Dallas, TX (US); John Fenske, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 198 days.

(21) Appl. No.: 16/203,343

(22) Filed: Nov. 28, 2018

(65) Prior Publication Data
US 2021/0014474 A1    Jan. 14, 2021

(51) Int. Cl.
*G06T 1/20* (2006.01)
*H04N 13/344* (2018.01)
*G02B 27/01* (2006.01)
*G06T 19/00* (2011.01)

(52) U.S. Cl.
CPC ....... *H04N 13/344* (2018.05); *G02B 27/0172* (2013.01); *G06T 1/20* (2013.01); *G06T 19/006* (2013.01); *G02B 2027/0134* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 10,706,813 | B1* | 7/2020 | Fruchter | G09G 5/397 |
| 2015/0081866 | A1* | 3/2015 | Cohen | H04L 67/02 |
| | | | | 709/223 |
| 2015/0198439 | A1* | 7/2015 | Uehira | G01B 11/2545 |
| | | | | 345/419 |
| 2015/0334365 | A1* | 11/2015 | Tsubaki | G06T 15/20 |
| | | | | 348/51 |
| 2016/0147078 | A1 | 5/2016 | Bedard | |
| 2017/0206713 | A1* | 7/2017 | Lo | G06T 7/00 |
| 2019/0199986 | A1* | 6/2019 | Ratti | G06T 1/20 |
| 2019/0310472 | A1* | 10/2019 | Schilt | H04N 21/2662 |

OTHER PUBLICATIONS

Liu, "An Optical See-Through Head Mounted Display with Addressable Focal Planes," 7th IEEE and ACM International Symposium on Mixed and Augmented Reality, ISMAR 2008, Cambridge, UK, Sep. 15-18, 2008 DOI: 10.1109/ISMAR.2008.4637321 IEEE, 445 and 501 Hoes Lane, Piscataway, NJ 08854-4141 USA.

(Continued)

*Primary Examiner* — Yanna Wu
(74) *Attorney, Agent, or Firm* — Michelle F. Murray; Frank D. Cimino (57) ABSTRACT

Described examples include an integrated circuit having depth fusion engine circuitry configured to receive stereoscopic image data and, in response to the received stereoscopic image data, generate at least: first and second focal perspective images for viewing by a first eye at multiple focal distances; and third and fourth focal perspective images for viewing by a second eye at multiple focal distances. The integrated circuit further includes display driver circuitry coupled to the depth fusion engine circuitry and configured to drive a display device for displaying at least the first, second, third and fourth focal perspective images.

22 Claims, 10 Drawing Sheets

(56) References Cited

OTHER PUBLICATIONS

Rolland, "Multifocal planes head-mounted displays," Applied Optics vol. 39, Issue 19, pp. 3209-3215 (2000) OSA—The Optical Society, 2010 Massachusetts Ave., N.W., Washington, D.C. 20036-1012 USA.

Geng, "Three-dimensional display technologies," Advances in Optics and Photonics 5, 456-535 (2013) OSA—The Optical Society, 2010 Massachusetts Ave., N.W., Washington, D.C. 20036-1012 USA.

Takaki, "Multi-projection of lenticular displays to construct a 256-view super multi-view display," Optics Express, vol. 18, No. 9 (Apr. 26, 2010) pp. 8824-8835 OSA—The Optical Society, 2010 Massachusetts Ave., N.W., Washington, D.C. 20036-1012 USA.

Liu, "A systematic method for designing depth-fused multi-focal plane three-dimensional displays," Optics Express, 18(11):11562-11573, 2010 OSA—The Optical Society, 2010 Massachusetts Ave., N.W., Washington, D.C. 20036-1012 USA.

* cited by examiner

MULTI-PERSPECTIVE DISPLAY DRIVER

TECHNICAL FIELD

This relates generally to imaging, and more particularly to three-dimensional imaging.

BACKGROUND

Stereoscopic imaging technology has been used to present three-dimensional images for well over a century. In the real world, the eyes see the same objects from a slightly different perspective because the eyes are physically separated. This allows the viewer to perceive depth. Stereoscopic technology takes advantage of this by providing separate images to the left and right eyes. A modern implementation of this is 3D movies. The viewer wears glasses designed for the 3D system. The 3D system uses polarization, shuttering or other techniques to provide separate images to the left and right eyes.

An implementation of stereoscopic technology that is growing in popularity is virtual reality goggles. The user wears a device over the eyes and separate images are provided to the left and right eyes. However, this implementation and other implementations have problems regarding the physiology of sight. When viewing an object in three dimensions, the eyes perform two functions simultaneously. First, the eyes focus at the distance of the image from the eyes. This is called focal distance. In traditional stereoscopic devices, the display is a fixed optical distance from the eyes. The eyes must focus on the display, so the focal distance is constant. Second, the eyes move to an angle commensurate with the perceived distance of the object. This is called vergence distance. The vergence distance varies with the perceived position of an object on the display. Thus, with stereoscopic technology, the images themselves are at one distance but the perceived distance of the object may be at another distance. This causes viewer fatigue. It is particularly a problem with virtual reality goggles because the focal distance may be a short distance.

SUMMARY

In accordance with an example, an integrated circuit includes depth fusion engine circuitry configured to receive stereoscopic image data and, in response to the received stereoscopic image data, generate at least: first and second focal perspective images for viewing by a first eye at multiple focal distances; and third and fourth focal perspective images for viewing by a second eye at multiple focal distances. The integrated circuit further includes display driver circuitry coupled to the depth fusion engine circuitry and configured to drive a display device for displaying at least the first, second, third and fourth focal perspective images.

DETAILED DESCRIPTION

Corresponding numerals and symbols in the different figures generally refer to corresponding parts unless otherwise indicated. The figures are not necessarily drawn to scale.

In the described examples, the problem of providing a large number of images in multifocal and multi-view stereoscopic displays is solved by receiving the two image stereoscopic data, with or without depth information, and deriving the multifocal or multi-view images at the display.

Figure 1:
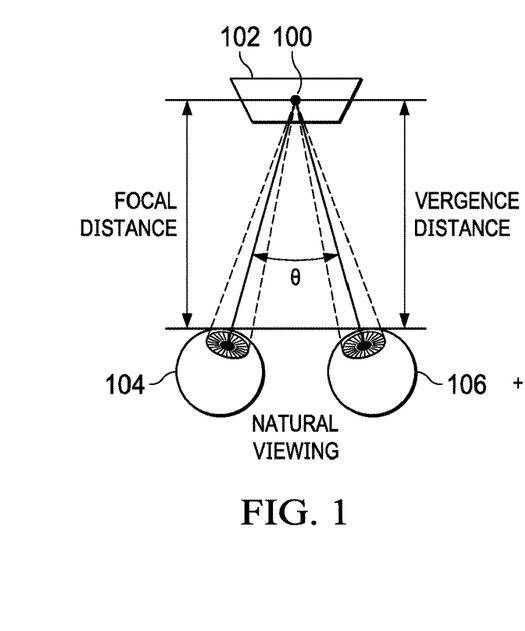
FIG. 1 is a diagram of a viewing situation.

FIG. 1 shows a viewing situation. Object 100 is perceived by the viewer to be at an optical distance equal to that of display 102. The left eye 104 and right eye 106 focus on object 100. This is the focal distance. In addition, left eye 104 and right eye 106 will turn slightly toward each other (converge). The angle θ between the viewing direction of the left eye 104 and the right eye 106 corresponds to a vergence distance. The mind expects the vergence distance and focal distance to be the same. In FIG. 1, they are the same. However, with stereoscopic devices such as virtual reality goggles that is not always the case, as is further explained hereinbelow.

Figure 2:
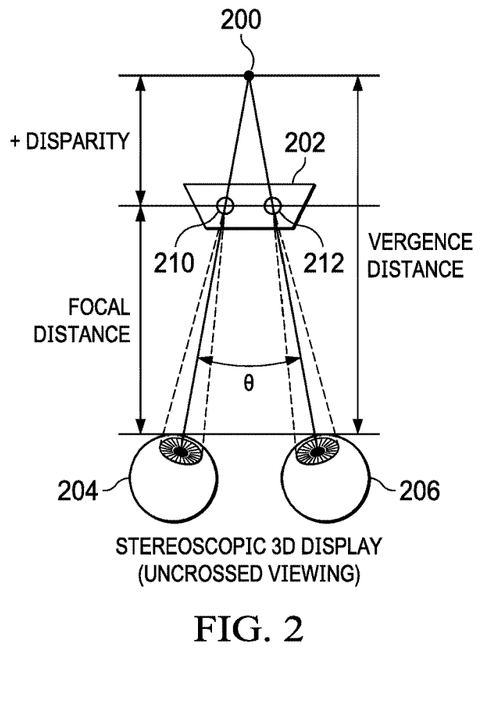
FIG. 2 is a diagram of another viewing situation.

FIG. 2 shows another viewing situation. Using stereoscopic techniques, left eye 204 focuses onto object 200 at point 210 on display 202. Display 202 is shown as a single display in FIG. 2, but in implementation would be two displays, one for each eye. Right eye 206 focuses onto object 200 at point 212 on display 202. The focal distance is the distance from left eye 204 and right eye 206 to display 202. However, object 200 is perceived to be at the vergence distance. Thus, the vergence of the eyes based on the angle Φ tells the mind to focus at the vergence distance. The difference between the vergence distance and the focal distance is the disparity. In this case the disparity is positive. However, the image would be out of focus if the eyes focused at the vergence distance, so the user forces the eyes to focus at the focal distance. This causes significant user fatigue, particularly with devices where the display is close to the eyes, for example when using virtual reality goggles.

Figure 3:
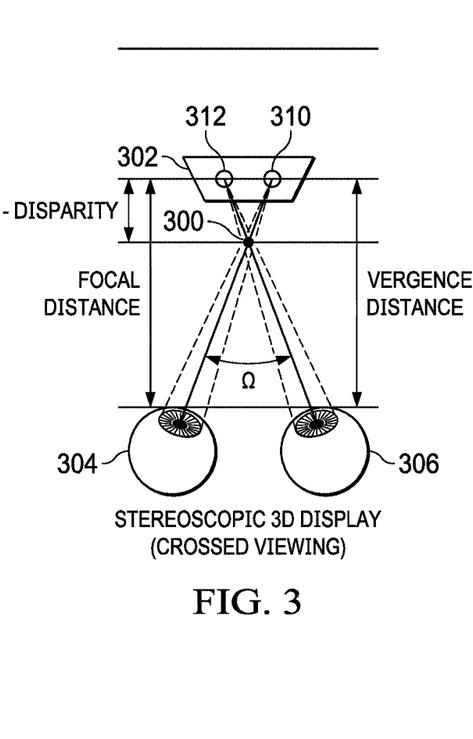
FIG. 3 is a diagram of another viewing situation.

FIG. 3 shows another viewing situation. Using stereoscopic techniques, left eye 304 focuses on object 300 at point 310 on display 302. Right eye 306 focuses on object 300 at point 312 on display 302. The focal distance is the distance from left eye 304 and right eye 306 to display 302. However, object 300 is perceived to be at the vergence distance. Thus, the vergence of the eyes based on the angle Ω tells the mind to focus at the vergence distance. The difference between the vergence distance and the focal distance is the disparity. In this case the disparity is negative. Again, the image would be out of focus if the eyes focused at the vergence distance, so the user forces the eyes to focus at the focal distance. This causes significant user fatigue, particularly with devices where the display is close to the eyes, for example when using virtual reality goggles.

To address this problem, multifocal viewing devices have been developed. In a multifocal device, multiple images at different focal depths are displayed for each eye. The stereoscopic images are processed to provide depth information or depth information is provided separately to the device. The displayed image is divided up by the depth position of portions of the image. Portions with a greater depth are displayed on a display having a greater focal depth. Portions that are nearer are displayed on a display having a shorter focal depth. These sub-displays are combined into one image to the viewer. This helps mitigate the focal depth/vergence problem. However, with images displayed for two eyes and multiple displays for each eye, the amount of image data transmitted to a multifocal device is very large. A frame rate of sixty frames per second is needed for a smooth video image. Thus, the large amount of data for the multifocal display must be transmitted and processed in one-sixtieth of a second. An ultra-high-definition image includes 8,294,400 pixels. Each pixel includes three colors with at least eight bits per color. If a multifocal display includes six displays per eye, the data transmission requirement is roughly 8,294,400×3×8×6×2×60 bits per second or 143.3 Mbps. This transmission rate is difficult to achieve with common, hard-wired data links, much less with wireless links.

Figure 4:
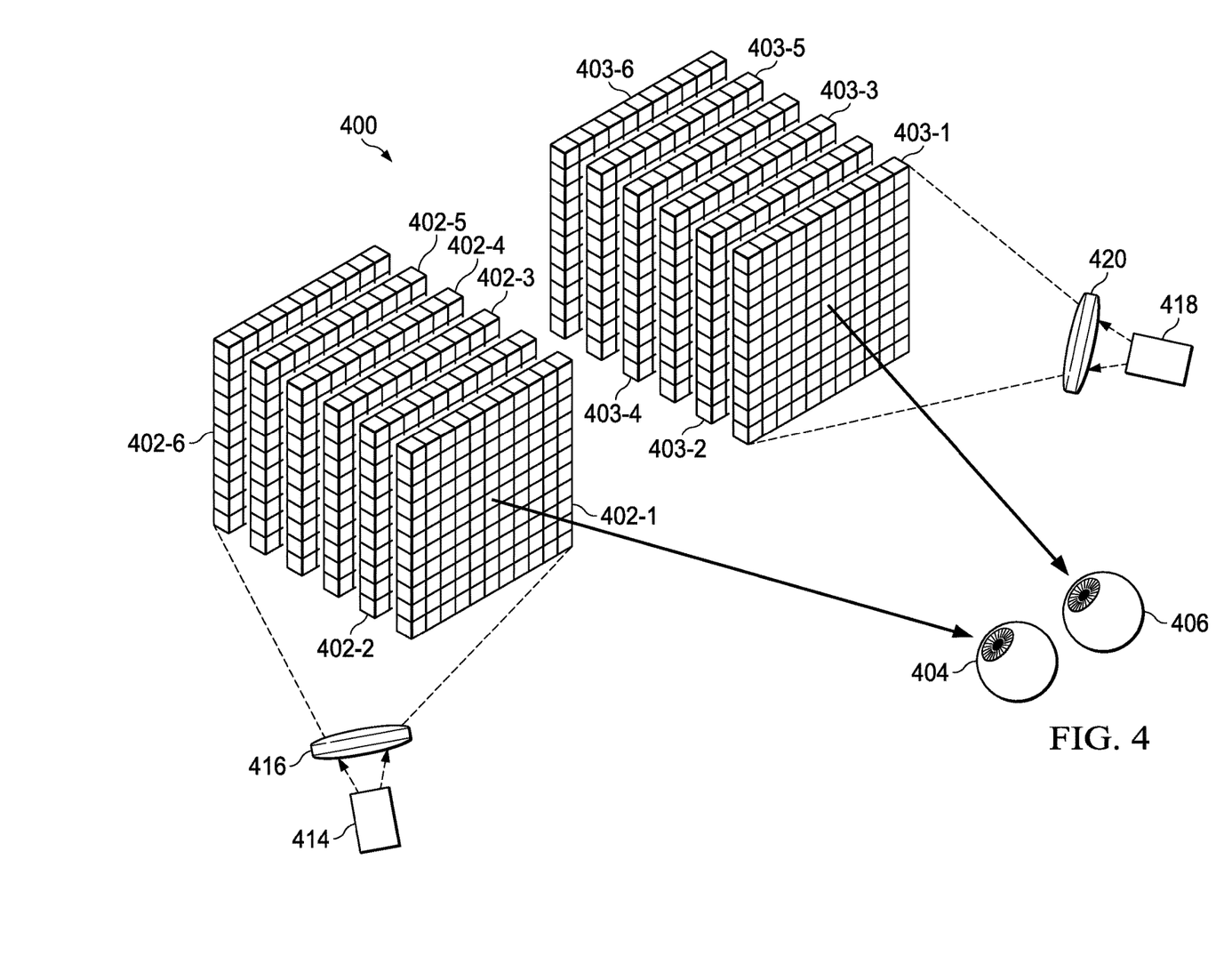
FIG. 4 is a diagram of a multiple perspective display.

FIG. 4 shows a multiple-perspective display device 400. In this example, the multiple-perspective display device 400 is a multifocal display. A multifocal display includes multiple displays at different focal distances for each eye. In FIG. 4, left eye 404 views displays 402-1 through 402-6. Light source 414 illuminates displays 402-1 through 402-6 through lens 416. Light source 414 is shown illuminating displays 402-1 through 402-6 from the front in FIG. 4 but may be configured to illuminate from the back. The image for left eye 404 is divided into six images based on depth information. As further explained hereinbelow, depth information is either provided with the image information or derived from processing the left and right eye images. Display 402-1 displays image information for close objects. From the depth information, only the parts of the image at a close depth are displayed on display 402-1. Other image information is displayed on other displays and display 402-1 is made to be transparent at those positions to allow viewing of displays behind display 402-1. Thus, for closer information, because of the closer focal distance of display 402-1, the disparity between the focal and vergence distances of the image on display 402-1 is reduced. Each of displays 402-1 through 402-6 has a different focal distance. The information displayed on each of displays 402-1 through 402-6 has a focal distance approximately equal to the depth of that information. Thus, for the image information displayed on displays 402-1 through 402-6, the disparity between the focal distance and the vergence distance is reduced. For right eye 406, light source 418 illuminates displays 403-1 through 403-6 through lens 420. As with displays 402-1 through 402-6, the information displayed on displays 403-1 through 403-6 display information having a depth matching the focal distance of each display. The use of six displays per eye in FIG. 4 is an example. More or fewer displays may be used. The displays of FIG. 4 reduce fatigue caused by the disparity between the vergence distance and the focal distance. However, image information of six times as many displays must be provided to the displays. This is difficult to provide except through very high-speed links, which are expensive and often impractical. Additional information on multifocal displays is provided in Sheng Liu and Hong Hua, "A systematic method for designing depth-fused multi-focal plane three-dimensional displays," Optics Express, 18(11):11562-11573, 2010, which is incorporated herein by reference. Another one of several configurations of multifocal displays is shown in U.S. Published Patent Application Pub. No. 2016/0147078, which is incorporated herein by reference. In the configuration shown in the published patent application, a variable liquid lens is used to alter the focal length of the display optics. Multiple focal planes are displayed using time division to provide a complete multifocal plane image. For these configurations and other multifocal systems, multiple images for each eye are displayed.

Figure 5:
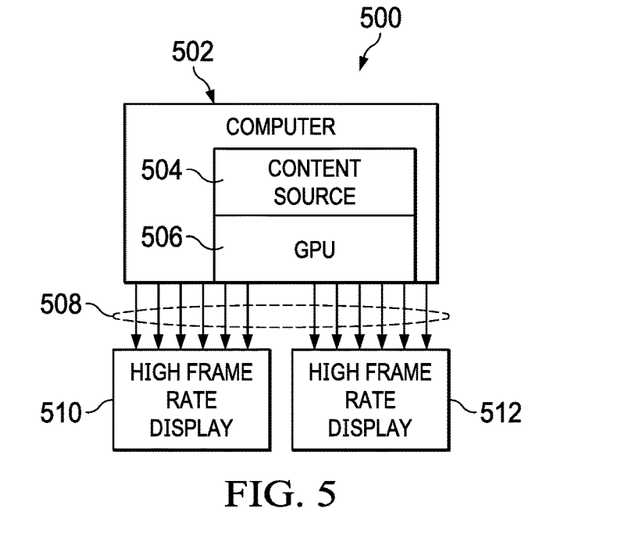
FIG. 5 is a schematic diagram of a display system for driving a multifocal display.

FIG. 5 shows a schematic diagram of a display system for driving a multifocal display. Display system 500 includes computer 502, which includes content source 504 and graphics processing unit (GPU) 506. GPU 506 provides twelve image feeds on lines 508. These image feeds include six image feeds for each of high frame rate displays 510 and 512. These six image feeds for each eye include the stereoscopic image for that eye divided up using depth information as described hereinabove regarding FIG. 4. The image feed lines 508 may be provided by twelve lines, but this would provide a cumbersome connection. In addition, many applications use wireless connections to virtual reality goggles. Providing twelve channels of data using readily available technologies such as Wi-Fi or Bluetooth is not practical due to data speed limitations.

Figure 6:
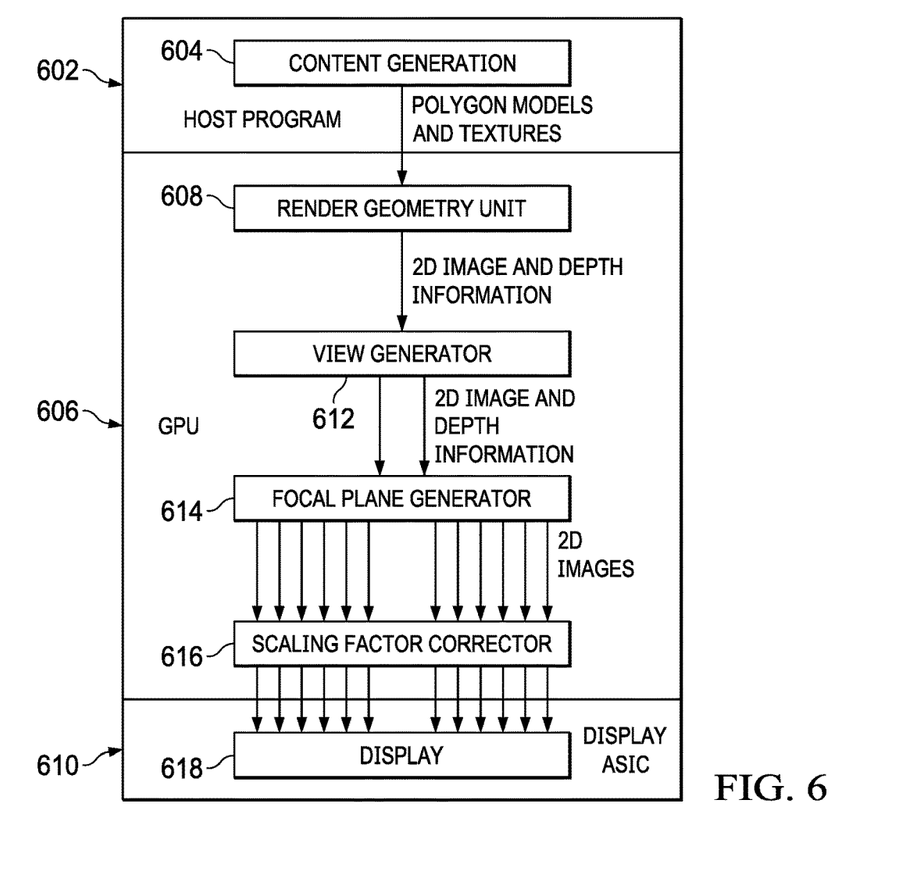
FIG. 6 is a more detailed schematic view of the system of FIG. 5.

FIG. 6 shows a more detailed view of system 500 (FIG. 5). Host program 602 runs on computer 502 (FIG. 5). In this example, content generation program 604 generates polygon models and textures to generate the video images. In other examples, the video images may be captured with cameras. Render geometry unit 608 in graphics processing unit (GPU) 606 renders the polygon models and textures into two-dimensional images and depth information. View generator 612 generates the left and right views. From the left and right views and the depth information, focal plane generator 614 generates the images for each focal plane. In this example, the focal plane generator produces six views for each eye, and thus provides twelve output images. Scaling factor corrector 616 corrects for scale (so that farther away portions of the image do not have a different apparent size from the nearer portions) and corrects for distortion. The twelve corrected images output from scaling factor corrector 616 are transmitted to display application specific integrated circuit (ASIC) 610 within, for example, virtual reality goggles (not shown). ASIC 610 drives display 618 to display the multifocal images.

Figure 7:
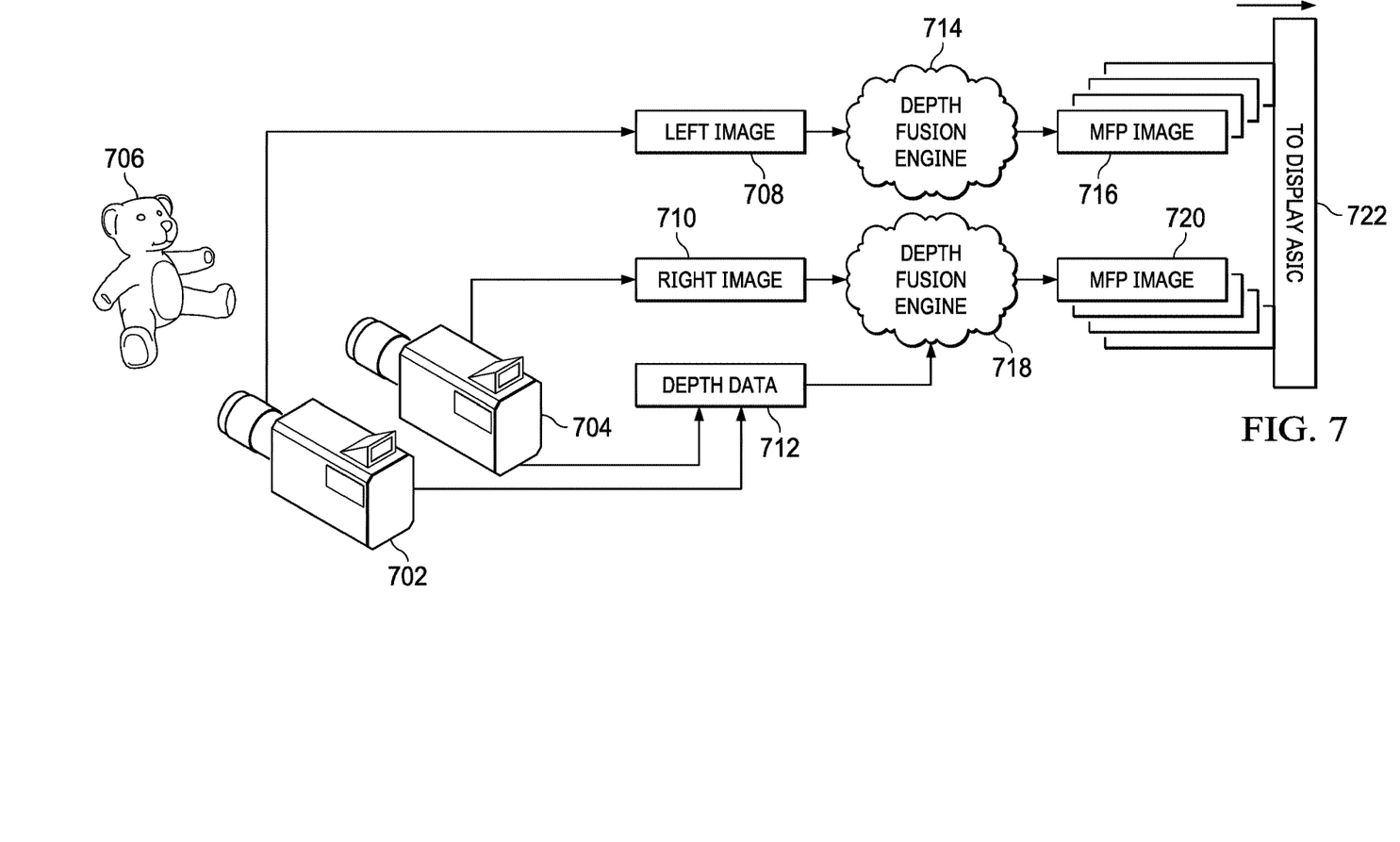
FIG. 7 is a diagram of an example process for providing multifocal images.

FIG. 7 shows an example process for providing multifocal images. Camera 702 and camera 704 capture the image of object 706 for the left eye and right eye, respectively. Camera 702 provides left image 708 and camera 704 provides right image 710. In addition, camera 702 and camera 704 provide depth data 712. Depth fusion engine 714 combines left image 708 with depth data 712 to provide multifocal plane images 716. In some examples, depth fusion engine 714 may also use data from right image 710. Depth fusion engine 718 combines right image 710 with depth data 712 to provide multifocal plane images 720. In some examples, depth fusion engine 718 may also use data from left image 708. Multifocal plane images 716 and multifocal plane images 720 are provided to application specific integrated circuit (ASIC) 722 to drive the multifocal plane displays such as displays 402-1 through 402-6 and displays 403-1 through 403-6 (FIG. 4). In some examples, camera 702 and camera 704 are not used. Rather, left image 708 and right image 710 are derived from an electronic rendering of object 706.

Figure 8:
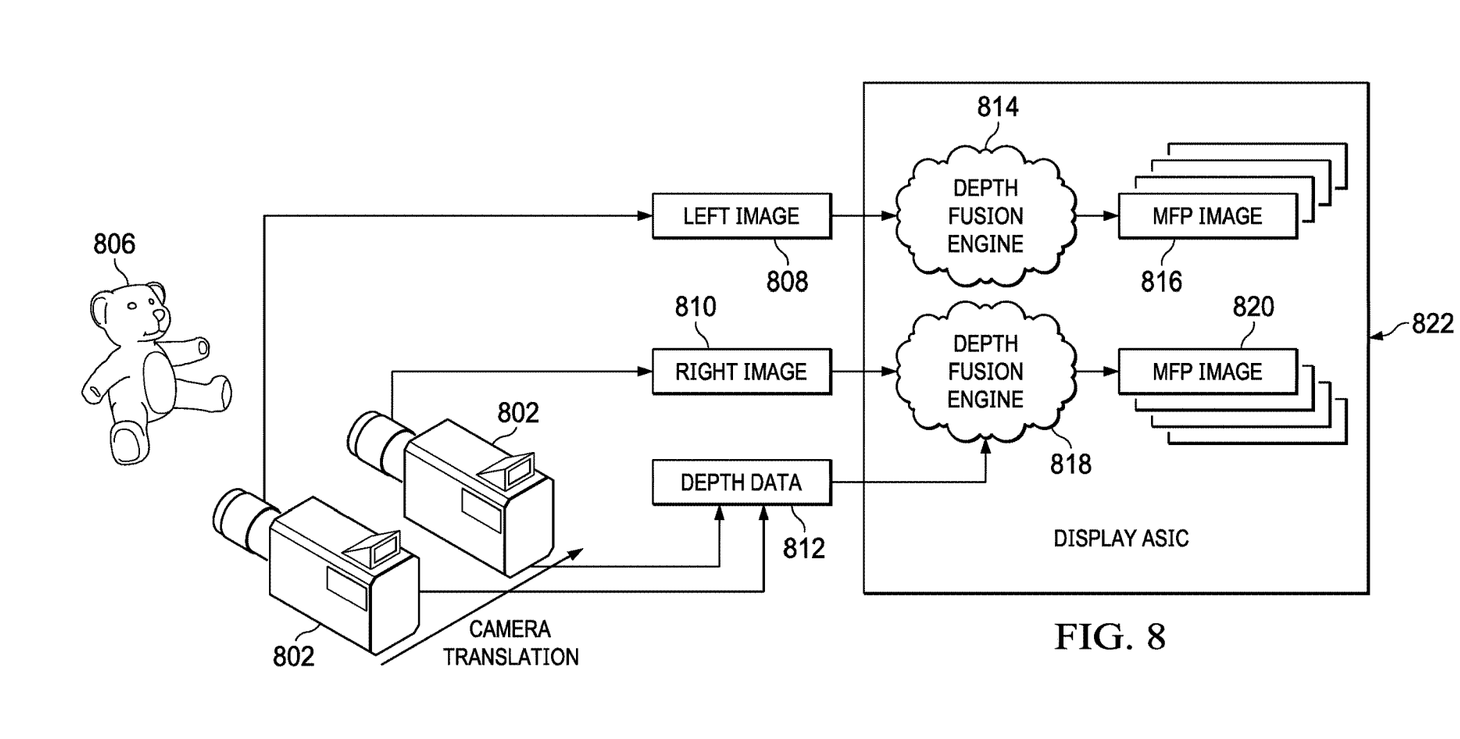
FIG. 8 is a diagram of another example process for providing multifocal images.

FIG. 8 shows another example process for providing multifocal images. In this example, one camera 802 is translated to a different position to capture the image of object 806 for the left eye and right eye. Camera 802 provides left image 808 and provides right image 810. In addition, camera 802 provides depth data 812. Depth fusion engine 814 combines left image 808 with depth data 812 to provide multifocal plane images 816. In some examples, depth fusion engine 814 may also use data from right image 810. Depth fusion engine 818 combines right image 810 with depth data 812 to provide multifocal plane images 820. In some examples, depth fusion engine 818 may also use data from left image 808. In this example, depth fusion engine 814 and depth fusion engine 818 produce multifocal plane images 816 and multifocal plane images 820 within ASIC 822, which drives the multifocal plane displays such as displays 402-1 through 402-6 and displays 403-1 through 403-6 (FIG. 4).

Figure 9:
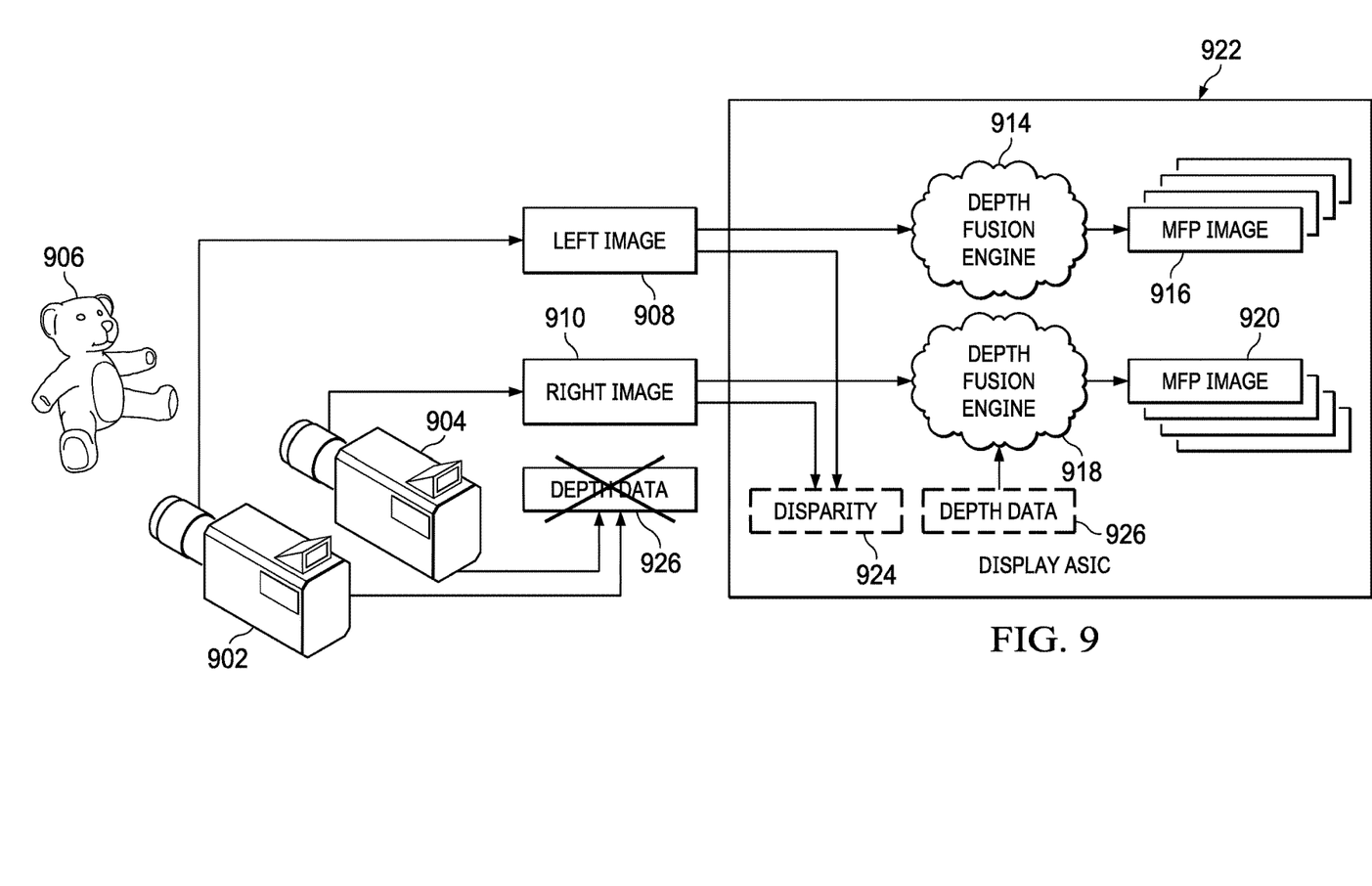
FIG. 9 is a diagram of another example process for providing multifocal images.

FIG. 9 shows another example process for providing multifocal images. In this example, left camera 902 and right camera 904 capture the image of object 906 for the left eye and right eye, respectively. Camera 902 provides left image 908 and provides right image 910. In this example, left camera 902 and right camera 904 do not provide depth data 912. Rather, left image 908 and right image 910 are provided to disparity processor 924, which produces depth data 926 within ASIC 922. The "disparity" in this case is not the disparity discussed regarding FIGS. 2 and 3, but rather is the difference between the left and right images. Depth fusion engine 914 combines left image 908 with depth data 926 to provide multifocal plane images 916. In some examples, depth fusion engine 914 may also use data from right image 910. Depth fusion engine 918 combines right image 910 with depth data 926 to provide multifocal plane images 920. In some examples, depth fusion engine 918 may also use data from left image 908. In this example, depth fusion engine 914 and depth fusion engine 918 produce multifocal plane images 916 and multifocal plane images 920 within ASIC 922, which drives the multifocal plane displays such as displays 402-1 through 402-6 and displays 403-1 through 403-6 (FIG. 4). In some examples, camera 902 and camera 904 are not used. Rather, left image 908 and right image 910 are derived from an electronic rendering of object 906.

Figure 10:
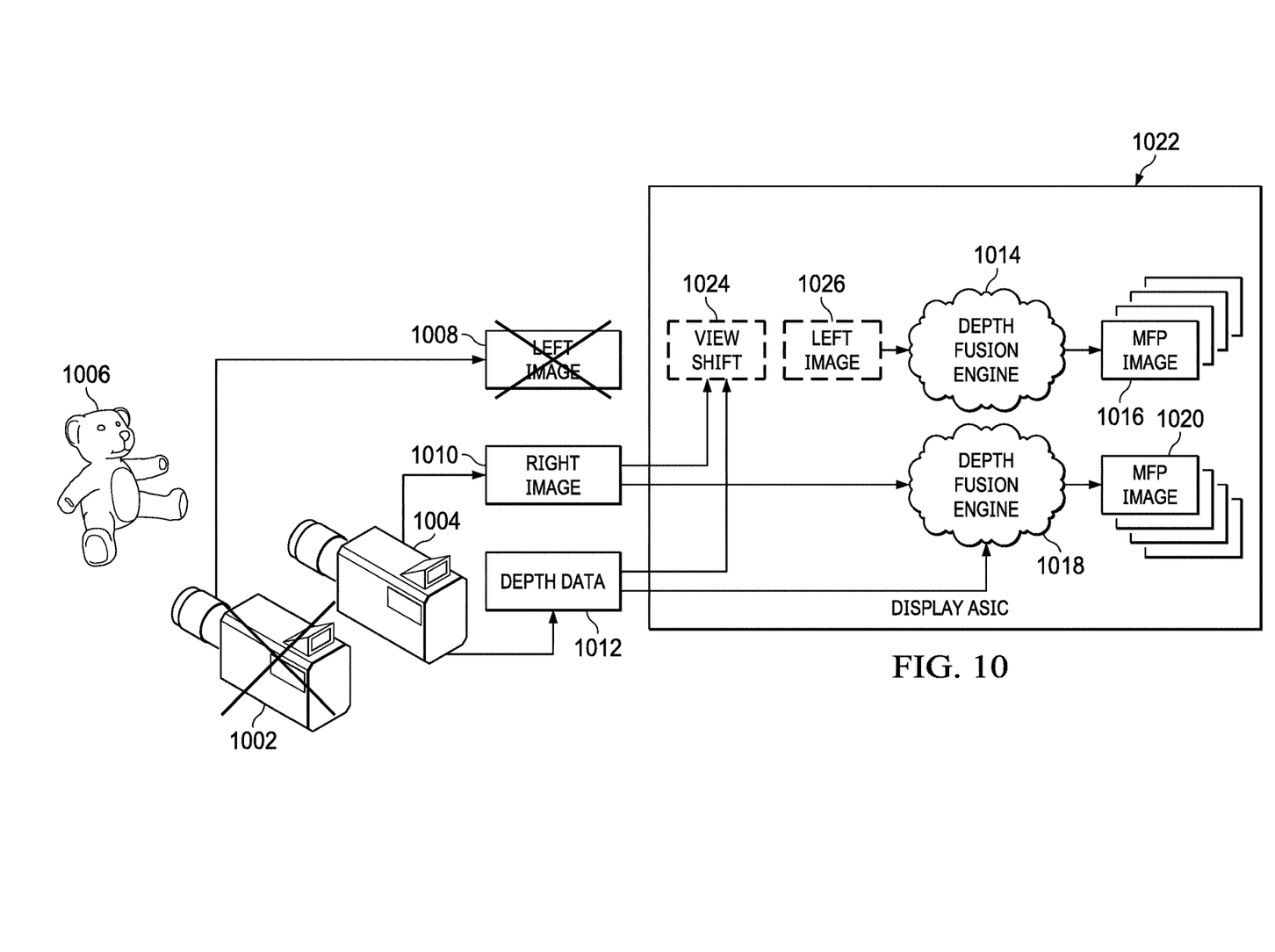
FIG. 10 is a diagram of another example process for providing multifocal images.

FIG. 10 shows another example process for providing multifocal images. In this example, right camera 1004 captures the image of object 1006 for the right eye. In this example, left camera 1002 is not used. Depth data 1012 is derived from the depth data of the right image 1010 and from left image depth data as generated from the right image depth data using a view shift algorithm. Left image 1008 is not transmitted. Rather, right image 1010 and depth data 1012 are provided to left image generator 1024, which reproduces left image 1026 within ASIC 1022 from right image 1010 and depth data 1012 using a view shift algorithm. Depth fusion engine 1014 combines left image 1026 with depth data 1012 to provide multifocal plane images 1016. In some examples, depth fusion engine 1014 may also use data from right image 1010. Depth fusion engine 1018 combines right image 1010 with depth data 1012 to provide multifocal plane images 1020. In some examples, depth fusion engine 1018 may also use data from left image 1026.

In this example, depth fusion engine 1014 and depth fusion engine 1018 produce multifocal plane images 1016 and multifocal plane images 1020 within ASIC 1022, which drives the multifocal plane displays such as displays 402-1 through 402-6 and displays 403-1 through 403-6 (FIG. 4). In some examples, camera 1002 and camera 1004 are not used. Rather, right image 1010 and depth data 1012 are derived from an electronic rendering of object 1006.

A variant of the process described regarding FIG. 10 is the H.264 section of the MP4 standard promulgated by the Moving Pictures Expert Group (MPEG). In that standard, the left image is encoded along with disparity data including the "delta" or differences between the right image and the left image. The "disparity" in this case is not the disparity discussed regarding FIGS. 2 and 3, but rather is the difference between the left and right images. That is, one data stream is the left image and the other data stream is the difference between the left and right images. The H.264 format reduces the amount of data transmitted or stored. With H.264 formatted data, the delta data stream is used to derive the right image and the depth information after receipt of the transmission.

Figure 11:
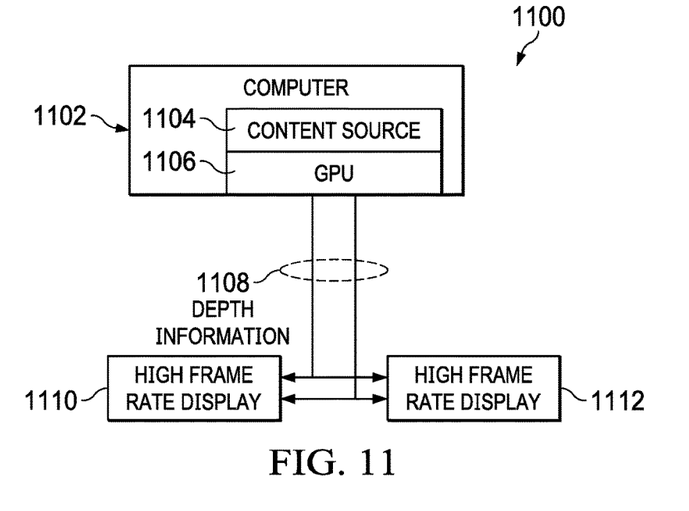
FIG. 11 is a schematic diagram of an example system for driving a multifocal display.

FIG. 11 shows an example system 1100 for driving a multifocal display. In this case, the video information resides as a content source 1104 on a computer 1102. GPU 1106 retrieves the content from content source 1104 and provides two data streams 1108. In this example, data streams 1108 include the right image and the depth information as described hereinabove regarding FIG. 10. In another example, data streams 1108 may include the information defined in the H.264 section of the MP4 standard. This information is provided to inputs of both high frame rate display 1110 and high frame rate display 1112. High frame rate display 1110 includes an ASIC or other circuitry that includes depth fusion engine circuitry to generate the images for multiple focal planes for one eye of the viewer. As explained more fully hereinbelow, high frame rate display 1112 also includes an ASIC or other circuitry that includes depth fusion engine circuitry to generate the images for multiple focal planes for the other eye of the viewer. Thus, the transmission from the computer to high frame rate display 1110 and high frame rate display 1112 uses two data links. For an ultra-high-definition image, the maximum data rate is roughly 8,294,400 pixels times three colors times eight bits times two data streams at 60 times per second. Thus, the transmission would include 8,294.400×3×8×2×60 bits per second or 23.9 Mbps. This can be achieved using a convenient wired link or using a wireless link. Wireless links are particularly advantageous with virtual reality goggles because it is desirable for the user to be mobile. Using the example system of FIG. 11, wireless links such as Wi-Fi or Bluetooth can be used to link the virtual reality goggles (high frame rate displays 1110 and 1112) to computer 1102.

Figure 12:
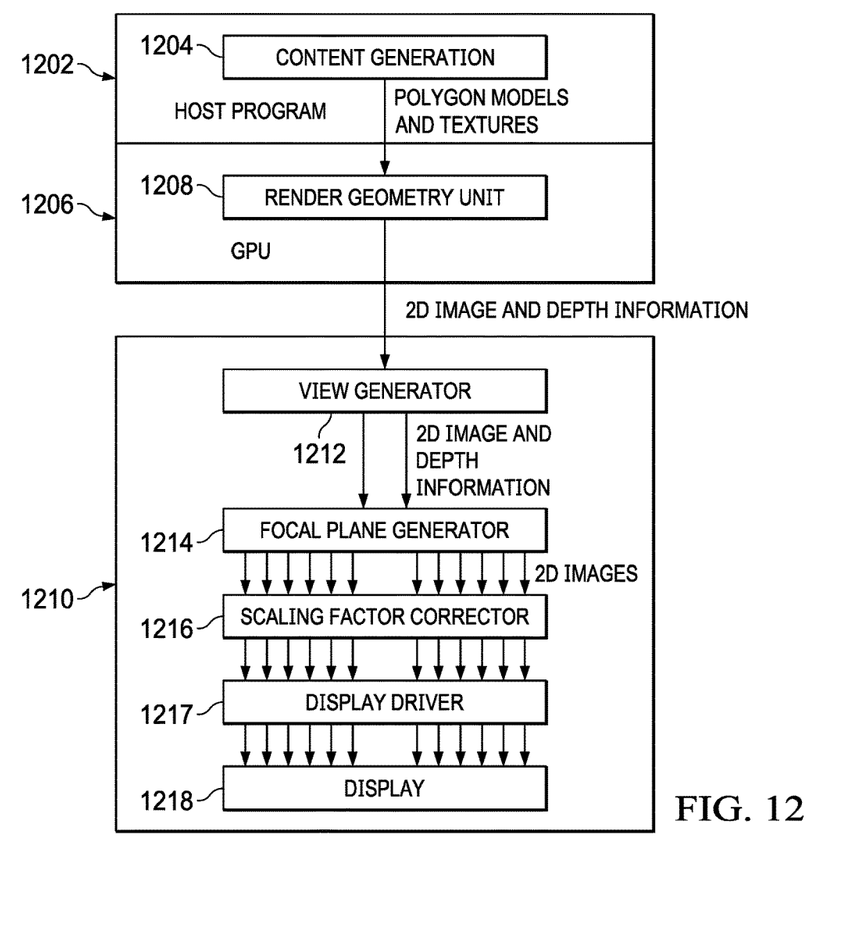
FIG. 12 is a more detailed schematic diagram of the display system of FIG. 11.

FIG. 12 shows a more detailed view of display system 1100 (FIG. 11). Host program 1202 runs on computer 1102 (FIG. 11). In this example, content generation program 1204 generates polygon models and textures to generate the video images. In other examples, the video images may be captured with a camera. Render geometry unit 1208 in GPU 1206 renders the polygon models and textures into two-dimensional images and depth information and transmits the two-dimensional images and depth information to application specific integrated circuit (ASIC) 1210. View generator 1212 in ASIC 1210 generates the left and right views and the depth information. From the left and right views and the depth information, focal plane generator 1214 includes a depth fusion engine that generates the focal perspective images. In this example, focal plane generator 1214 generates six focal plane images for each eye, and thus provides twelve output images. Scaling factor corrector 1216 corrects for scale (so that farther away portions of the image do not have a different apparent size from the nearer portions) and corrects for distortion. The twelve corrected images are output from scaling factor corrector 1216 to display driver 1217 to drive display 1218. ASIC 1210 is located with the display in, for example, virtual reality goggles (not shown). Because transmission of the image data to the ASIC occurs from render geometry unit 1208, the example of FIG. 12 uses two output lines for left/right transmission, for left-plus-depth, right-plus-depth, or one-image-plus-disparity transmission. In another example, three output lines would be used if both left and right images are transmitted along with the depth or disparity information. In other examples, ASIC 1210 is a hybrid circuit, a semi-custom integrated circuit (IC), a custom IC, a complex programmable logic device (CPLD), field programmable gate array (FPGA) or other logic array, a programmable IC or software running on an appropriate processing device, such as a MIPS or ARM core, or a digital signal processor.

Figure 13:
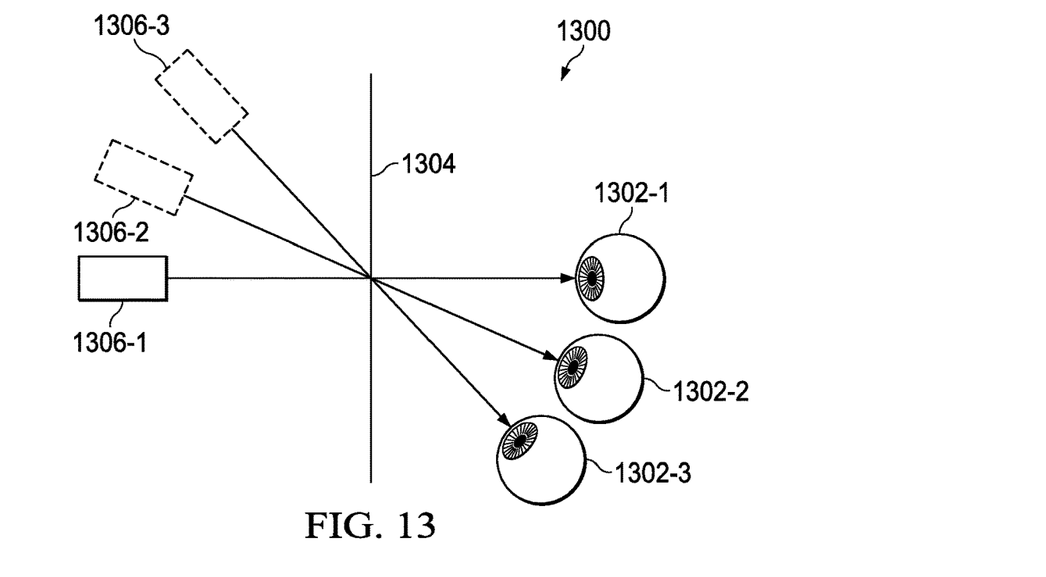
FIG. 13 is a diagram of a multi-view display.

FIG. 13 shows a multiple perspective display. In this example, multiple perspective display 1300 is a multi-view display or light field stereoscopic system. In viewing position 1302-1, the viewer sees the image on the screen projected by projector 1306-1. FIG. 13 only shows one image line. However, to provide a three-dimensional stereoscopic image, projector 1306-1 is two projectors. As examples, screen 1304 uses a lenticular lens system (see, e.g., Takaki et al., "Multi-projection of lenticular displays to construct a 256-view super multi-view display," Optics Express, Vol. 18, No. 9 (26 Apr. 2010) pp. 8824-35, which is incorporated herein by reference) or a parallax barrier system (see, e.g., Geng, "Three-dimensional display technologies," Advances in Optics and Photonics 5, 456-535 (2013), which is incorporated herein by reference). When viewing a three-dimensional object, if the viewer changes position, the view of the object changes. Viewing position 1302-2 and 1302-3 show different viewing positions from viewing position 1302-1. To display the three-dimensional object properly, a viewer at these other viewpoints should view a slightly different pair of images. To provide the separate views, additional projectors 1306-2 and 1306-3 are used to project these images. Screen 1304 can separate these views using the lenticular lens or parallax barrier technology, as described in the hereinabove cited articles. A different method of providing different views is to monitor the position of the viewer and change the view provided by projector 1306-1 depending on the position of the viewer. Either method requires multiple views provided at a high rate.

Figure 14:
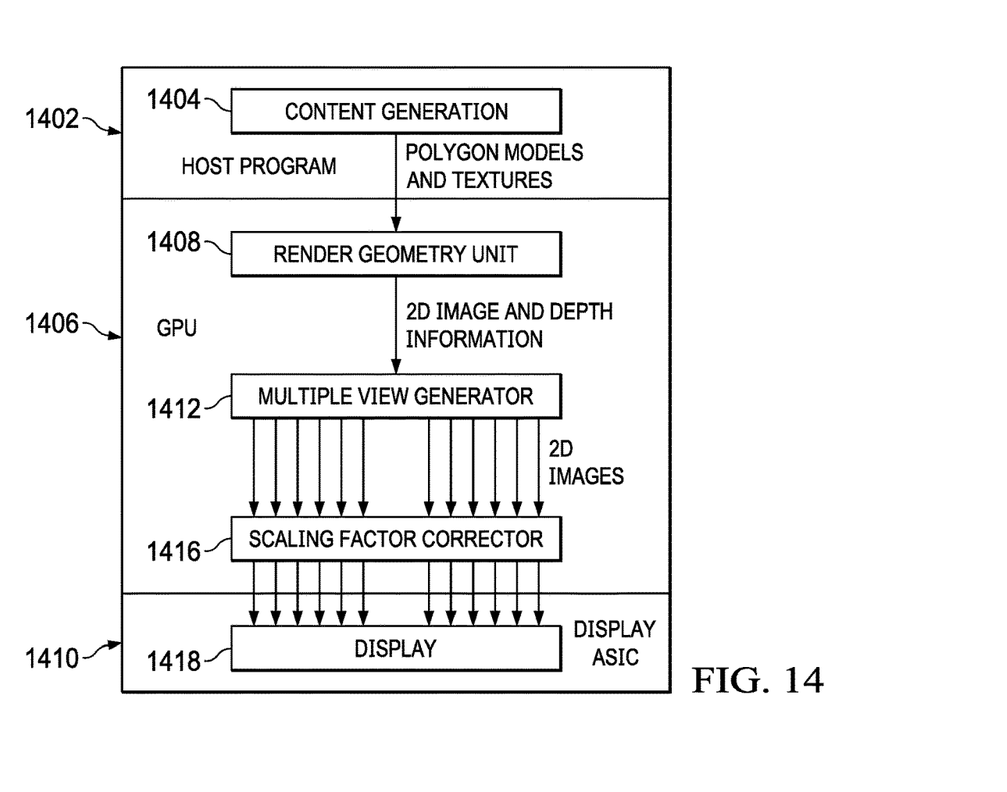
FIG. 14 is a schematic diagram of a display system for providing multiple views.

FIG. 14 shows a display system for providing multiple views. Host program 1402 provides content generation 1404, which provides polygon models and textures to generate the video images. In other examples, the video images may be captured with a camera. Render geometry unit 1408 in GPU 1406 renders the polygon models and textures into two-dimensional images and depth information. Multiple view generator 1412 generates multiple pairs of left and right views. In this example, multiple view generator 1412 can produce up to six views for each eye, and thus provides twelve output images for six different viewpoints. Scaling factor corrector 1416 corrects for scale and corrects for distortion. The twelve corrected images output from scaling factor corrector 1416 are transmitted to display application specific integrated circuit (ASIC) 1410 within a display like that shown in FIG. 13. ASIC 1410 drives display 1418 to display the multi-view images.

Figure 15:
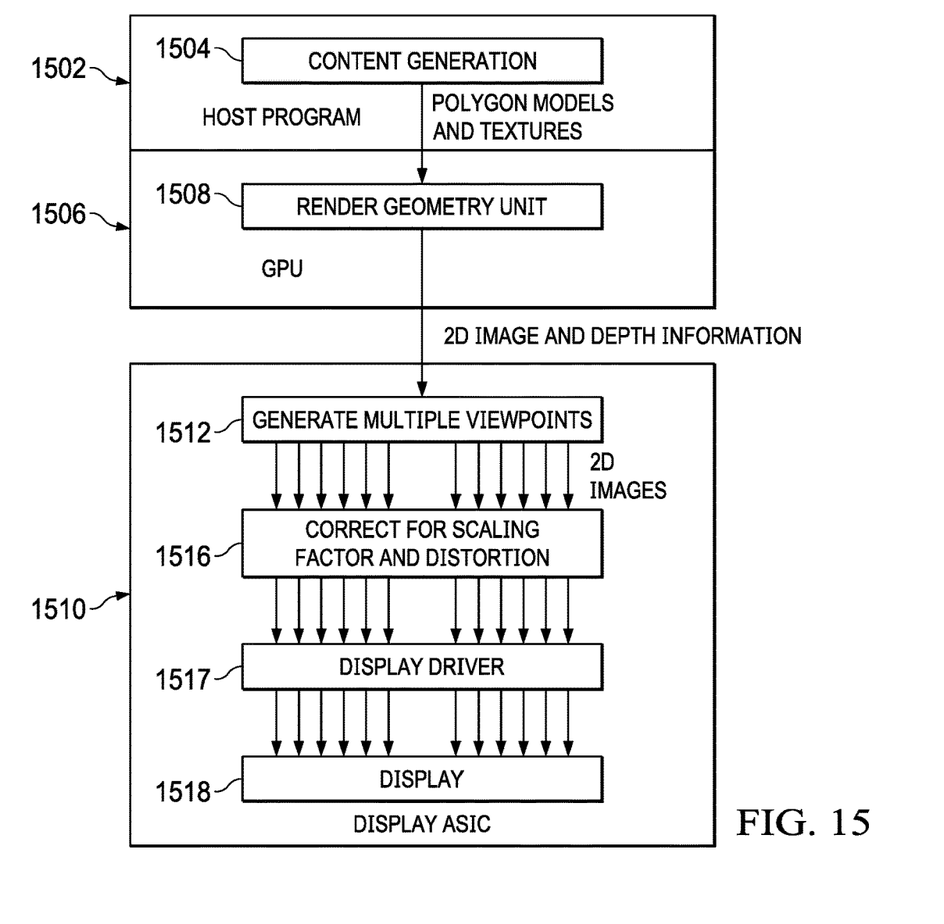
FIG. 15 is a schematic diagram of an example display system for providing a multi-view display.

FIG. 15 shows an example display system for providing a multiple perspective display. In this example, the display is a multi-view display like display 1300 (FIG. 13). Host program 1502 provides content generation 1504, which provides polygon models and textures to generate the video images. In other examples, the video images may be captured with a camera. Render geometry unit 1508 in GPU 1506 renders the polygon models and textures into two-dimensional images and depth information that is transmitted to ASIC 1510. Multiple view generator 1512 in ASIC 1510 receives the two-dimensional images at an input generates multiple pairs of left and right views. In this example, multiple view generator 1512 includes a depth fusion engine that generates six focal perspective images views for each eye, and thus provides twelve output images for six different viewpoints. The depth fusion engine in multiple view generator is different from the depth fusion engine in focal plane generator 1214 (FIG. 12) in that depth information is used to provide different viewpoint images rather than multiple focal planes. Scaling factor corrector 1516 in ASIC 1510 corrects for scale and corrects for distortion. The twelve corrected images are output from scaling factor corrector 1516 to display driver 1517 to drive display 1518 to display the multi-view images. Because transmission of the image data to ASIC 1510 occurs from render geometry unit 1508, the example of FIG. 15 uses two output lines for left/right transmission or for left-plus-depth, right-plus-depth or one image plus disparity transmission. In another example, three output lines would be used if both left and right images are transmitted along with the depth information. In other examples, ASIC 1510 is a hybrid circuit, a semi-custom integrated circuit (IC), a custom IC, a complex programmable logic device (CPLD), field programmable gate array (FPGA) or other logic array, a programmable IC or software running on an appropriate processing device, such as a MIPS or ARM core or digital signal processor.

Figure 16:
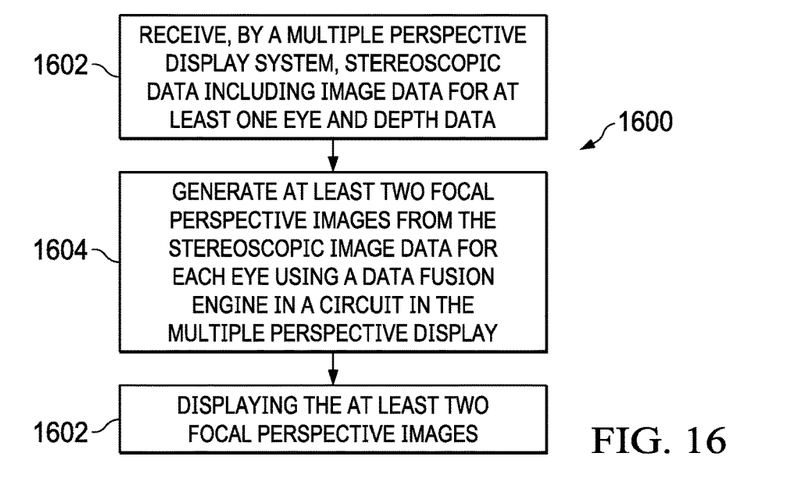
FIG. 16 is a flow diagram of an example method.

FIG. 16 shows a flow for an example method 1600. In step 1602, a multiple perspective display system, such as ASIC 1210 with display 1218 (FIG. 12) or ASIC 1510 with display 1518 (FIG. 15), receives stereoscopic data including image data for at least one eye and depth data (or disparity data) such as that provided by render geometry unit 1208 (FIG. 12) or render geometry unit 1508 (FIG. 15). In step 1604, at least two focal perspective images are generated from the stereoscopic image data for each eye using a depth fusion engine, such as focal plane generator 1214 (FIG. 12) or multiple view generator 1512 (FIG. 15) in a circuit in the multiple perspective display, such as a display included with ASIC 1210 (FIG. 12) or ASIC 1510 (FIG. 15). In step 1606, the focal perspective images are displayed on a display, such as display 400 (FIG. 4) or display 1300 (FIG. 13).

Modifications are possible in the described examples, and other examples are possible, within the scope of the claims.

What is claimed is:

1. An integrated circuit IC configured to:
receive, from a processing unit, rendered stereoscopic image data comprising a two dimensional (2D) image and depth information corresponding to the 2D image;
produce, based on the 2D image and the depth information, a first image having a first depth and a second image having a second depth, the first depth being different than the second depth;
produce, based on the 2D image and the depth information, a third image having a third depth and a fourth image having a fourth depth, the third depth being different than the fourth depth;
drive first displays to display the first image and the second image; and
drive second displays to display the third image and the fourth image.

2. The IC of claim 1, wherein the 2D image comprises image data for one eye.

3. The IC of claim 2, wherein the depth information comprises disparity data.

4. The IC of claim 1, wherein the first, second, third, and fourth images are focal plane images or viewpoint images.

5. The IC of claim 1, further configured to generate a fifth image having a fifth depth, a sixth image having a sixth depth, a seventh image having a seventh depth, an eighth image having an eighth depth, a ninth image having a ninth depth, a tenth image having a tenth depth, an eleventh image having an eleventh depth, and a twelfth image having a twelfth depth, and to drive the first displays to display the fifth image, the sixth image, the seventh image, and the eighth image, and to drive the second displays to display the ninth image, the tenth image, the eleventh image, and the twelfth image.

6. The IC of claim 1, wherein the first depth is the same as the third depth and the second depth is the same as the fourth depth.

7. The IC of claim 1, wherein receiving the stereoscopic image data comprises receiving the stereoscopic image data from the processing unit over a wireless link.

8. A system comprising:
a display device comprising first displays and second displays; and
an integrated circuit (IC) coupled to the display device, the IC configured to:
  receive, from a processing unit, rendered stereoscopic image data comprising a two dimensional (2D) image and depth information corresponding to the 2D image;
  produce, based on the 2D image and the depth information, a first image having a first depth and a second image having a second depth, the second depth being different than the first depth;
  produce, based on the 2D image and the depth information, a third image having a third depth and a fourth image having a fourth depth, the fourth depth being different than the third depth;
  drive the first displays to display the first image and the second image; and
  drive the second displays to display the third image and the fourth image.

9. The system of claim 8, wherein the 2D image comprises image data for one eye.

10. The system of claim 9, wherein the depth information comprises disparity data.

11. The system of claim 8, wherein the first, second, third and fourth images are focal plane images or viewpoint images.

12. The system of claim 8, wherein the IC is further configured to generate a fifth image having a fifth depth, a sixth image having a sixth depth, a seventh image having a seventh depth, an eighth image having an eighth depth, a ninth image having a ninth depth, a tenth image having a tenth depth, an eleventh image having an eleventh depth, and a twelfth image having a twelfth depth.

13. The system of claim 8, wherein the display device is virtual reality goggles.

14. The system of claim 8, wherein the first depth is the same as the third depth and the second depth is the same as the fourth depth.

15. The system of claim 8, wherein receiving the stereoscopic image data comprises receiving the stereoscopic image data by the IC from the processing unit over a wireless link.

16. A method comprising:
receiving, by an integrated circuit (IC) from a processing unit, rendered stereoscopic image data comprising a two dimensional (2D) image and depth information corresponding to the 2D image;
producing, by the IC, based on the 2D image and the depth information, a first image having a first depth and a second image having a second depth, the second depth being different than the first depth;
producing, by the IC, based on the 2D image and the depth information, a third image having a third depth and a fourth image having a fourth depth, the fourth depth being different than the third depth;
driving, by the IC, first displays to display the first image and the second image; and
driving, by the IC, second displays to display the third image and the fourth image.

17. The method of claim 16, wherein the first, second, third and fourth images are focal plane images or viewpoint images.

18. The method of claim 16, wherein the 2D image comprises image data for one eye.

19. The method of claim 18, wherein the depth information comprises disparity data.

20. The method of claim 16, wherein the first depth is the same as the third depth and the second depth is the same as the fourth depth.

21. The method of claim 16, wherein receiving the stereoscopic image data comprises receiving the stereoscopic image data by the IC from the processing unit over a wireless link.

22. The method of claim 16, further comprising performing scaling factor correction on the first image, the second image, the third image, and the fourth image.

* * * * *